Figure 1:
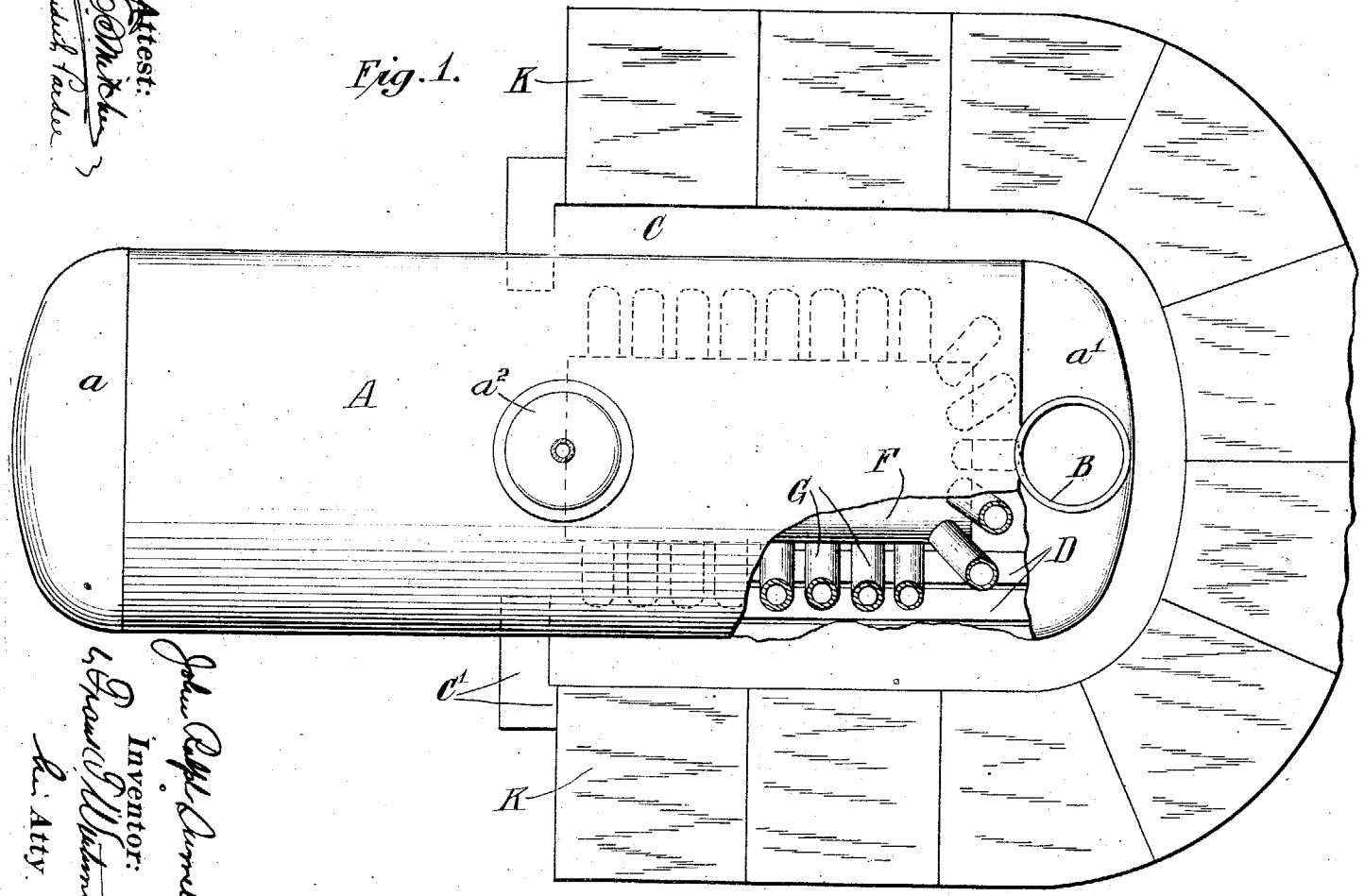

J. R. SURRELL.

BOILER FURNACE AND FEED WATER HEATER.

APPLICATION FILED JULY 14, 1915.

Reissued Oct. 26, 1915.

14,002.

4 SHEETS—SHEET 1.

Attest:
S. D. Mitchell
Judith Pardee

John Ralph Surrell
Inventor:
by Frank T. Wentworth
his Atty.

J. R. SURRELL.

BOILER FURNACE AND FEED WATER HEATER.

APPLICATION FILED JULY 14, 1915.

Reissued Oct. 26, 1915.

14,002.

4 SHEETS—SHEET 2.

Attest:
F. E. Mitchell
Judith Pardee

John Ralph Surrell Inventor:
by Frank P. Wentworth
his Atty.

J. R. SURRELL.

BOILER FURNACE AND FEED WATER HEATER.

APPLICATION FILED JULY 14, 1915.

Reissued Oct. 26, 1915.

14,002.

4 SHEETS—SHEET 3.

Attest:
N. C. Mitchell
Judith Parker

John Ralph Surrell
by Frank P. Wentworth
his Atty.

Inventor:

J. R. SURRELL.
BOILER FURNACE AND FEED WATER HEATER.
APPLICATION FILED JULY 14, 1915.
Reissued Oct. 26, 1915.
14,002.
4 SHEETS—SHEET 4.
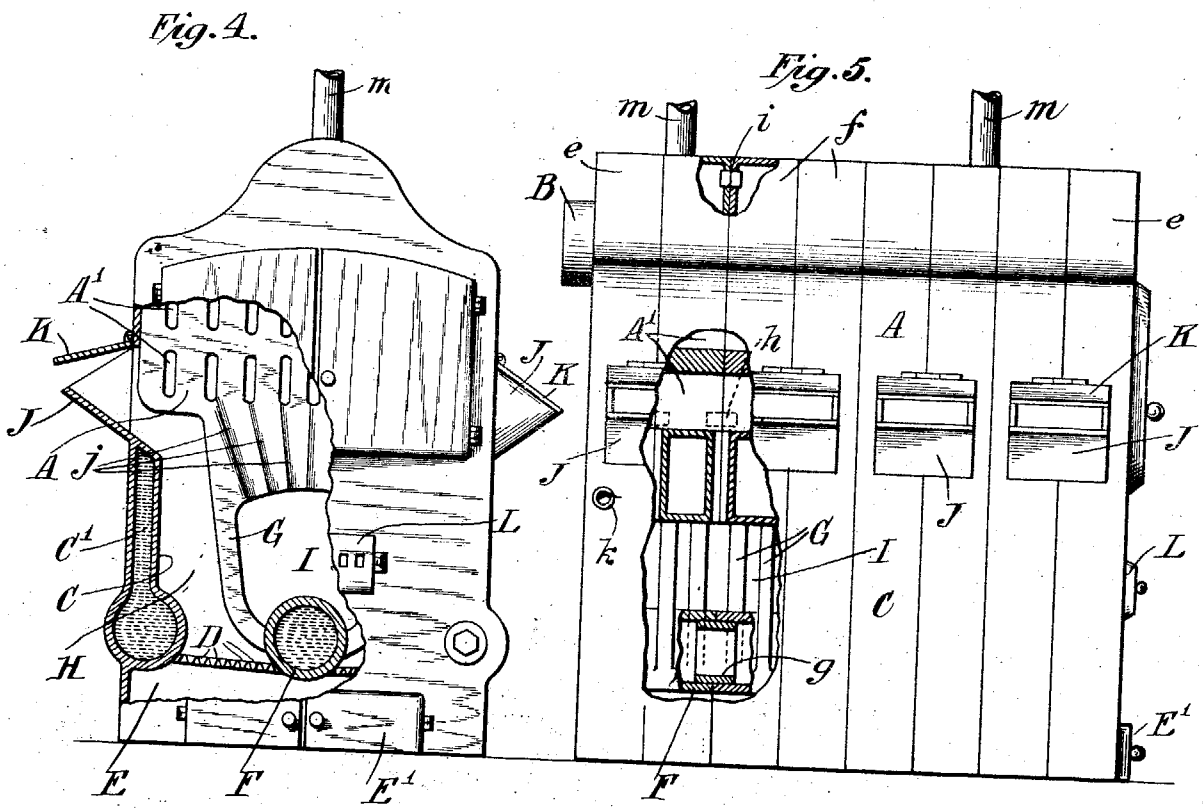
Attest:
C. Mitchell
Judith Pardee
John Ralph Surrell Inventor:
by Frank P. Wentworth
his Atty

UNITED STATES PATENT OFFICE.

JOHN RALPH SURRELL, OF NEW YORK, N. Y.

BOILER FURNACE AND FEED-WATER HEATER.

14,002. Specification of Reissued Letters Patent. Reissued Oct. 26, 1915.

Original No. 1,067,494, dated July 15, 1913, Serial No. 662,349. Application for reissue filed July 14, 1915. Serial No. 39,932.

DIVISION A.

*To all whom it may concern:*

Be it known that I, JOHN RALPH SURRELL, a subject of the King of the United Kingdom of Great Britain and Ireland, residing at the borough of Manhattan, in the city, county, and State of New York, have invented certain new and useful Improvements in Boiler Furnaces and Feed-Water Heaters, of which the following is a specification, reference being had therein to the accompanying drawings, which form a part thereof.

My invention relates to boiler furnaces and feed water heaters and more particularly to a type thereof wherein there is a down draft, through the fuel combustion chamber, and which embodies therein water tubes or legs in communication with the boiler in a manner to insure the circulation of the water through these tubes or legs by reason of the high temperature thereabout.

A boiler furnace and feed water heater made in accordance with my invention, is so constructed as to permit the distillation of fuel in the fuel combustion chamber, and the subsequent burning of the gases produced by such distillation in a manner to heat the water in the water tubes or legs, while at the same time utilizing the high temperatures necessary for coking and consuming the fuel for raising the temperature of the water in the said water tubes or legs. Those heat units not utilized in this manner are brought into such relation to the heat areas of the boiler into which water from said water tubes or legs is delivered, as to secure high efficiency from the fuel consumed. The boiler furnace and feed water heater is so constructed as to prevent bridging or choking of the combustion chamber by the fuel in a manner to interfere with that suction draft through the fuel bed necessary to insure an uninterrupted and continuous distillation of the fuel. The herein described boiler furnace and feed water heater may be so constructed as to be adapted for use in connection with high pressure steam power plants, or low pressure plants for use in connection with the heating system of a building, the construction thereof being such as to permit the convenient application of a high suction, or forced draft, to insure the rapid distillation and consumption of the fuel, or of a low suction, or natural, draft from an ordinary flue, to insure the slow continuous distillation and consumption of the fuel. If desired means may be, and in low pressure apparatus preferably are, provided whereby the suction operative to produce the down draft through the fuel combustion chamber, may be regulated. By arranging the water tubes or legs in the manner herein described a chamber for the gases produced in the fuel combustion chamber is formed.

The fuel combustion chamber is surmounted by a fuel hopper for a reserve supply of fuel sufficient to insure an automatic, continuous feeding of fresh fuel to the fuel combustion chamber or fire box, the construction and arrangement of the furnace and the water tubes or legs being such as to provide a construction adjacent the outlet of said hopper in a manner to minimize the tendency of the fire to extend into and consume the fuel while in said hopper. Closure means is provided for said hopper so that the down draft through said hopper and the fire box or fuel combustion chamber, may be regulated or controlled. The fuel combustion chamber or fire box is so constructed that there will be a direct drop of the ash bed and the fuel. The outer wall of said fire box is so constructed as to resist the high temperatures within said fuel combustion chamber, preferably a water jacketed furnace wall being used, said jacket being in communication with the boiler in a manner to utilize the heat units extracted from the fuel by water in said jacket.

By means of a boiler furnace and feed water heater constructed as herein described, the fuel consumption may be restricted to the boiler needs under different conditions, by closing different portions of the fuel hopper, thus confining the draft to a portion only of the fuel bed.

For low pressure apparatus, the structure is made of sections of small capacity which may be readily cast, a plurality of these sections being connected in a manner to permit the free circulation of water through all of the sections of the boiler, the feed water heater and the water jacket, these portions of each section being connected, the connection in assembling the boiler being for the purpose of connecting one section with another as distinguished from the different portions of one section with those of the adjoining sections.

By so constructing the water tubes or legs as to have the adjacent surfaces thereof within the gas and air combustion chamber diverge, I permit a free expansion of the gases when entering said chamber and at the same time exclude fuel in the fuel combustion chamber from said air and gas combustion chamber.

The invention consists in the novel features of construction and combination of parts hereinafter set forth and described and more particularly pointed out in the claims hereto appended.

Figure 2:
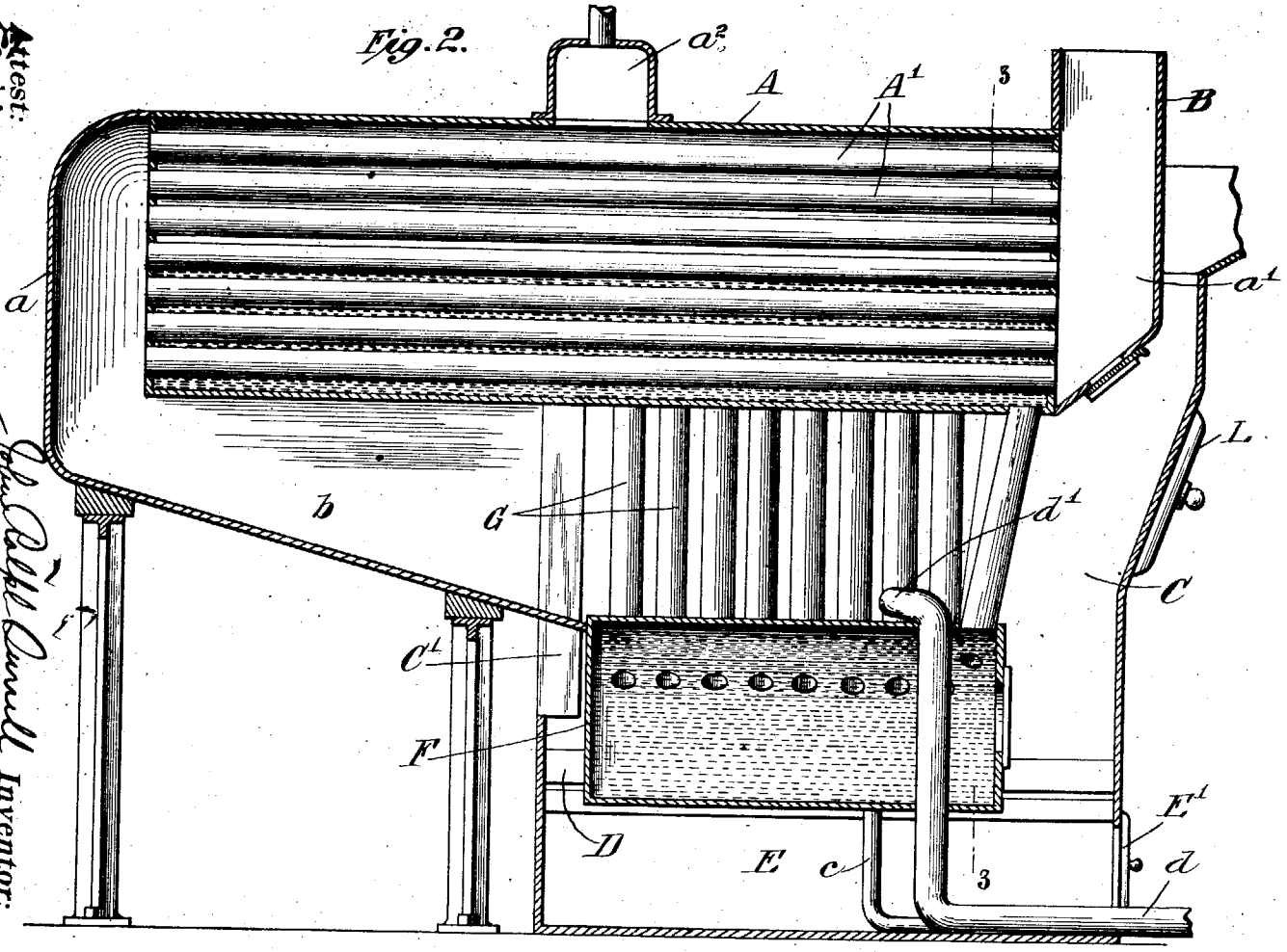
Figure 3:
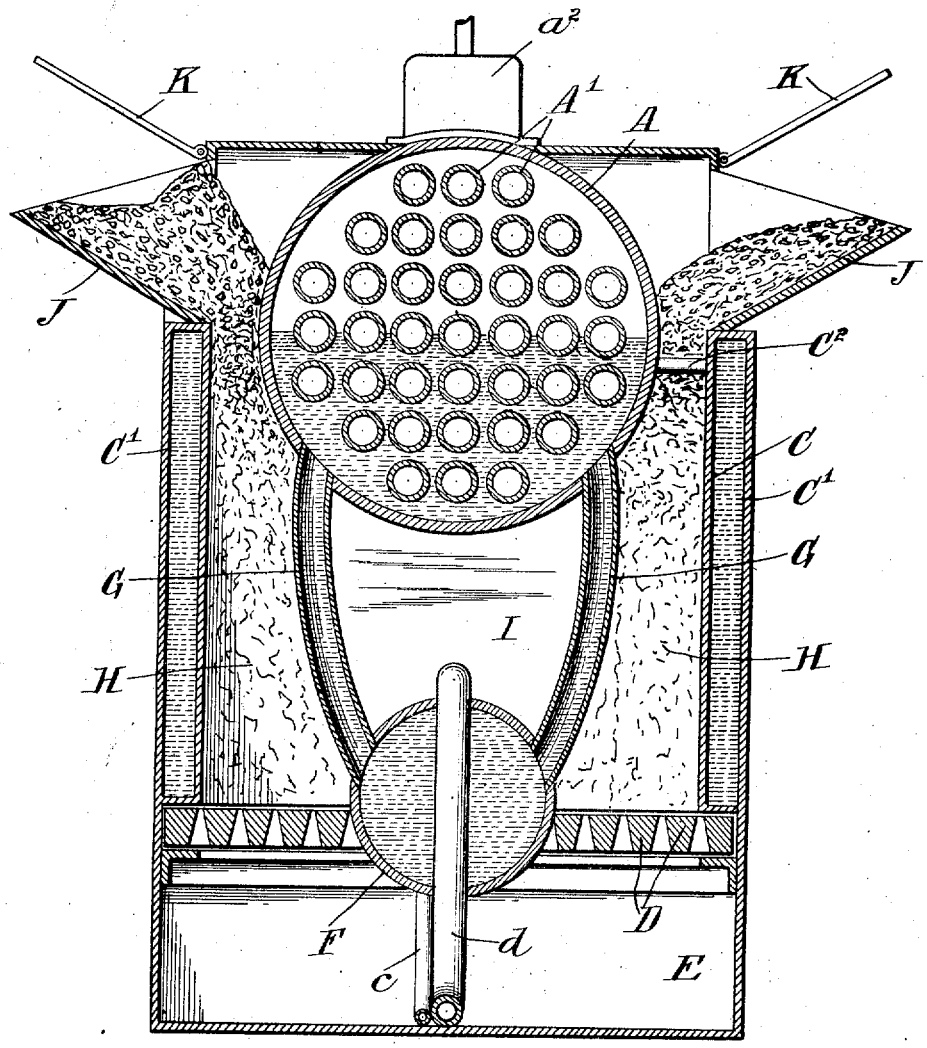

Referring to the drawings:—Figure 1 is a plan view of a furnace boiler and feed water heater embodying my invention, portions thereof being broken away; Fig. 2 is a vertical longitudinal section thereof; Fig. 3 is a vertical transverse section thereof; Fig. 4 is an elevation of a modified form of the invention partly broken away; and Fig. 5 is a side elevation of the form of the invention shown in Fig. 4, broken away and disclosing the manner of connecting the different sections assembled in the apparatus.

Like letters refer to like parts throughout the several views.

The two forms of the invention shown in the accompanying drawings possess in common the essential characteristics of my invention, the variations in the structures of these two forms being merely such as to adapt each to the particular use for which it is designed.

In each form of the invention shown, I employ in connection with a boiler A, having heat areas as the fire tubes or flues A′ communicating at B with a chimney or stack not shown. Associated with the boiler A, is a furnace C having an ordinary fire grate D and an ash pit E, the latter being provided with doors as E′ for permitting the removal of ashes from the ash pit while normally excluding air therefrom.

Located within the said furnace in such close proximity to the grate D as to prevent the passage of fuel ashes beneath it, is a water drum F in communication with the lower portion of the water space within the boiler A through a plurality of water tubes or legs G, thus insuring a free circulation of the water between the said boiler and the said drum. These water tubes or legs divide the furnace in a manner to form a fuel combustion chamber H, between the said water legs and the wall C of the furnace and an air and gas combustion chamber I within said water tubes or legs and between the boiler A and the drum F. To permit a direct fall of the fire, the said water tubes or legs are so set with relation to the furnace wall as to gradually increase the capacity of the fuel combustion chamber from the top thereof toward the fire grate. By this construction I also provide a gas and air combustion chamber I, which has greater capacity toward the top thereof or adjacent the boiler.

Preferably I employ two sets of parallel water tubes or legs G, one at each side of the furnace. These tubes or legs are set sufficiently close together to exclude fuel and ashes from the gas and air combustion chamber, the inclination of said tubes or legs away from the side wall assisting in securing this result. Each of the said water tubes or legs G is so shaped in cross section, that the surface thereof within, or toward, the gas and air combustion chamber diverges or flares outwardly thus permitting sufficient construction of the passage between adjacent tubes or legs to prevent the entrance into the air and gas combustion chamber of the fuel and ashes, while permitting the gases to pass readily therebetween and to freely expand when entering the said chamber. In the preferred form of the invention shown in the drawings, I secure this result by using water tubes or legs G, rounded upon the portion thereof presented toward the fuel combustion and toward the air and gas combustion chamber respectively. This arrangement also assists in directing the gases to all portions of the gas and air combustion chamber I, the side wall of the furnace being solid so as to insure this direct flow of the gases to the said chamber I.

By locating the constriction in the fuel combustion chamber H at a point above the bottom of the boiler A, I am enabled to bring the incandescent body of fuel to a height above the openings between the water tubes or legs G, thus not only subjecting the boiler proper A to the direct action of the fire, but providing a zone of high temperature through which the air and the distillates must pass before entering the gas and fuel combustion chamber. In this manner I free these gases from the heavier distillates and deliver to said chamber I a free burning gas which will not foul the water tubes or legs G or the heat areas of the fire tubes or flues A′ of the boiler A. The constriction of the combustion chamber H will also have the effect of preventing the fire creeping up into the fuel supply reserve in the hopper J surmounting and discharging through said constriction into the combustion chamber H.

Air is passed downwardly through the combustion chamber H by being admitted adjacent the constriction in said chamber. In the form of the invention shown this air is admitted through the fuel hopper J, which is provided with closure means, as a plurality of hinged covers K, by means of which the quantity of air passing through the hopper to the combustion chamber may be controlled. By using a plurality of such closure means K, the draft may be localized in a manner to limit the fuel consumption to a restricted area when the demands upon the boiler are reduced. With an increased demand upon the boiler, however, more or all of the doors may be opened so as to bring the conditions within the combustion chamber to a point where they will meet the increased demand upon the boiler.

To counteract the effects of the high temperature conditions within the combustion chamber, I preferably provide the wall C of the furnace with a water jacket C′ in communication with the boiler A in a manner to cause the discharge of heated water from said jacket into said boiler thus insuring not only a saving of the heat units extracted from the incandescent fuel by the water in said jacket but maintaining a circulation of water between the jacket and the boiler. In the form of the invention shown in Figs. 1 to 3 of the drawings, the connection between the water jacket and the boiler is shown at $C^2$. (See Fig. 3.)

As will more fully appear hereinafter, if it is desired to limit the consumption of fuel to conform to reduced boiler needs, some of the closure means or doors K may be closed as desired. Hence, if it be desired to use only one set of water tubes or legs G, this may be done by closing all of the closure means or doors K upon one side of the apparatus, thus making the set of water tubes or legs upon that side practically inoperative by reason of the reduction in the temperatures by reason of the cutting off of the draft upon that side of the apparatus. By using a plurality of sets of water tubes or legs, I am enabled to increase the maximum efficiency of the apparatus by increasing the heat areas subjected to the high temperatures of the combustion chamber.

The furnace C is provided with an opening opposite one end of the gas and air combustion chamber I, this opening being closed by the door L. While this opening may be used for cleaning the said chamber I, it may also be used for introducing air directly to said chamber in small quantities for securing a proper combustible mixture within said chamber, or in larger quantities for checking the draft when slowing down the fire. In a low pressure boiler, this door L is provided with damper openings, and the usual damper plate for controlling the same. (See Fig. 4.)

In the form of the invention shown in Figs. 1 to 3 which is especially adapted for use in conjunction with a high pressure steam plant, the boiler A is provided with the usual headers $a$—$a'$ and with a heat case $b$ beneath one end of the boiler and communicating with the header $a$. The header $a'$ is in communication with the flue B. The burning gases delivered to said chamber I pass through said heat case to the heat areas of the boiler A at the same time acting upon the bottom of said boiler. In this form of the invention, the drum F and the furnace C are located under one end of the boiler A. In this type of apparatus, the water tubes or legs may, if desired, be extended across the end of the boiler as shown and the furnace C and hopper J may also be extended as shown to inclose all of said water tubes or legs. In the form of the invention shown in Figs. 1 to 3 water is introduced to the drum F through the feed water pipe $c$. In connection with the high pressure apparatus, I provide a pipe $d$ terminating in a jet nozzle $d'$ discharging into the gas and air combustion chamber I by means of which air or steam under pressure, may be charged into said chamber for the purpose of creating a forced draft, or greater suction, operative upon the fuel bed in the fuel combustion chamber H. The pipe $d$ may be connected with an independent source of supply of compressed air or steam under pressure, or may be connected with the boiler A as desired. The steam is withdrawn from the boiler from the dome $a^2$ or in any desired manner.

In the form of the invention shown in Figs. 4 and 5 the apparatus is composed of two end sections $e$—$e'$ and a plurality of intermediate similar, independent sections $f$ capable of being so assembled as to form the boiler A, the water drum F and the furnace C. Each of these sections comprises a portion of the boiler A, a portion of the water drum F, and two or more water tubes or legs connecting said boiler and said drum, portion. The portions of the water drum of adjoining sections $f$ are connected by means of nipples $g$, and the boiler portions of said sections are connected with adjacent boiler sections, by means of nipples $h$ and $i$, thus insuring uniform conditions throughout the boiler and permitting a free circulation of water throughout the same. Each of the sections $f$ is also provided with a portion of the furnace wall C and its water jacket C′, which portions in assembling the device, are connected by means of nipples, or in any other desired manner so as to permit a free circulation of the water throughout the said jacket. The said jacket may be placed in communication with the boiler in any desired manner. Each of the boiler portions of the various sections $f$ has therethrough a plurality of flue sections adapted to register with the flue sections of the adjoining sections $f$ when the device is assembled. When the various sections $f$ are assembled, a continuous air and gas combustion chamber I is formed and a continuous fuel combustion chamber H inclosing said water tubes or legs. In this form of the invention I provide a plurality of small hoppers J each provided with a closure K instead of a continuous hopper as shown in the form of the invention illustrated in Figs. 1 to 3. The two hopper arrangements shown in the different forms of the invention illustrated in the accompanying drawings, are interchangeable, however.

The side face of each of the sections *f* is provided with channels or heat flues *j* through which the gases delivered to the chamber I, pass to the boiler flues or heat areas in the same manner and for the same purpose as said gases pass through the heat case *b*, in the form of the invention shown in Figs. 1 to 3.

Each of the sections *f* is preferably cast in one integral structure, and the various sections are assembled by any desired means such as stay rods extending from end to end of the apparatus through the various sections. In this form of the invention, that shown in Figs. 4 and 5, water may be introduced to the apparatus in any desired manner as through the pipe *k* and the steam or hot water is withdrawn therefrom in any desired manner as through the pipes *m*.

The operation of the boiler furnace and feed water heater herein described is substantially as follows:—The boiler A, drum F, water legs G and water jacket C′ having been filled with water, a fire is started in the fuel combustion chamber H; and said chamber and the hopper J surmounting same, are filled with fuel. In operating the apparatus, some or all of the doors K will be left open so that the suction draft applied to the flues A′ and gas and air combustion chamber I, whether the same results from a natural draft of the chimney or stack, or this draft supplemented by a steam or air jet from the nozzle *d*′, will create a down draft through the body of fuel in the fuel combustion chamber H. By providing a closed furnace wall opposite the water legs G, and arranging the drum F in close juxtaposition to the fire grate D, the path of the gases produced in the combustion chamber H is limited to the openings between the water tubes or legs G communicating with the air and gas combustion chamber I. In this manner all of these gases are compelled to pass to said chamber I, and an accumulation of gases within the furnace is prevented. The heat from the fire in the chamber H is not only utilized in raising the temperature of the water in the boiler A and in the water tubes or legs G, but also in securing a continuous distillation of the fuel in the upper portion of said chamber, so that the distillates will be drawn downwardly of the said chamber H through the high temperature zones of the incandescent fire bed, and delivered to the chamber I practically free of the heavier distillates and fire carbon which would tend to foul the heat areas of the boiler A, or of the tubes G. The consumption of the combustible gases within the chamber I, and about the tubes G, will subject these tubes throughout practically the entire surface thereof to intense heat and thus rapidly heat the water therein before delivering it to the boiler A. The location of the drum F below the high temperature zones of the furnace will insure the maintenance of the proper circulation of water therefrom through the water tubes or legs, to the boiler.

If it be found in starting the fire that insufficient oxygen is introduced, with the gases, to the chamber I, air may be admitted in small volume through the opening closed by the door L to secure a good combustible mixture at this time. This opening may also be used when the degree of heat of the various heat zones in the fire is not sufficiently high to produce gases having the desired combustible property, or when insufficient air is passed through the fire bed to produce the desired combustible mixture. This door may also be used for dampening the fire by raising the pressure within the chamber I in a manner to reduce the suction operative upon the combustion chamber H for inducing a down draft therein.

When the device is in operation, the doors E′ of the ash pit E should be closed to prevent a draft counter to the down draft in the chamber H, and the escape of gases through the top draft opening or openings for said chamber H. By utilizing a water jacket for the furnace C, loss of heat through radiation is not only minimized but heat absorbed by the water in said jacket, is utilized in maintaining the desired high temperatures within the boiler A. Under some conditions it may be desirable to use a refractory lining in lieu of said water jacket, but I have found said water jacket to be highly desirable, particularly in connection with low pressure apparatus.

It will thus be observed that a high percentage of the heat units contained in the fuel consumption in the chamber H is utilized in preheating the water delivered to the boiler. I materially increase the efficiency of the apparatus, however, by passing the heated gases, after leaving the chamber I, through the heat flues of the boiler A. By subjecting the bottom of the boiler to these gases prior to their passage through the flues, I also increase the efficiency secured from each pound of coal.

If it be desired to reduce the capacity of the boiler, it is merely necessary to close one or more of the closures K, thus limiting the areas of high temperature within the furnace and the quantity of air and gases delivered to the chamber I.

In an apparatus made in accordance with my invention, intense heat is developed within the combustion chamber H with a deep fire bed of comparatively small area. When my invention is used in connection with a low pressure boiler, the desired temperatures may be developed by a slow consumption of the fuel and a low suction draft. With high pressure boilers, however, where a more rapid consumption of fuel is required to supply the necessary volume of heat, it is sometimes desirable to use the jet nozzle *d'* for increasing the effective suction upon the fuel bed for the purpose of accelerating the fuel consumption and raising the temperatures within said chamber and the chamber I.

By constricting the discharge port of the hopper J and by providing water legs projecting downwardly and at an angle away from the wall of the furnace C, I secure an automatic feeding of the fuel to the chamber H, prevent the extension of the fire to the fuel within the hopper and insure a free passage of the air and gases through the body of fuel by reason of the increased capacity of the chamber toward the bottom thereof causing a direct or shear dropping of the fire and a resultant avoidance of bridging or choking of the chamber H. The location of the constriction in the chamber H above the water tubes or legs G causes a downward flow of the air and gases through the fire bed for a sufficient distance to insure uniformity in the temperature conditions at a level of the fire in said chamber and at the same time compels the air and distillates to pass through a sufficiently deep body of incandescent fuel to produce a clean combustible mixture before its introduction to the chamber I.

During the operation of the apparatus there will be a free and constant circulation between the drum F and the boiler A through the water legs G, water being delivered at a high temperature through said water legs, into said boiler. The grate D may be used in the usual manner to drop the fire in the chamber H when necessary.

In the form of the invention shown in Figs. 4 and 5, the entire volume of heated gases in the chamber I instead of being passed below the entire surface of the boiler above the drum F before entering the flues A', are passed through the various vertical flues *j* between each of the sections *f* to the flues or heat areas through the boiler. In this manner, the requisite suction upon the chambers H and I to insure the proper draft is secured; and at the same time, heat units are conserved by increasing the effective heat areas of the boiler, and subjecting them to the gases when at their higher temperatures. At the same time I secure a more effective distribution of the gases and maintain a more uniform condition of the fire bed. Water is delivered to the apparatus as required through the pipes *c* and *k*.

The increase in the capacity of the chamber I toward the top thereof assists in securing a proper distribution of the air and gases in passing from the chamber II about all of the water tubes or legs G to the chamber I. This increase in the capacity of the upper portion of the said chamber I also increases the heat area of the boiler A subjected directly to the action of the heated gases in said chamber while they are at their highest temperatures and the action of said heated gases upon substantially the entire surface of each of the water tubes or legs G.

It is not my intention to limit my invention to the precise details of construction shown in the accompanying drawings, it being apparent that such may be varied without departing from the spirit and scope of the invention.

Having described the invention what I claim as new and desire to have protected by Letters Patent is:—

1. A boiler furnace and feed water heater for steam boilers having a water chamber and heat areas, embodying therein a furnace, a water drum within said furnace below said boiler, a plurality of water tubes or legs, the opposite ends of which open directly into the water space within said boiler, and into said water drum, respectively whereby a fuel combustion chamber is formed between the boiler and said legs, and the side wall of said furnace, and a gas and air combustion chamber in communication with said fuel combustion chamber intermediate said water tubes or legs and the water areas of the boiler is formed between said water tubes or legs, the boiler and said water drum, a fuel hopper surmounting and discharging into said fuel combustion chamber, said furnace being closed at the bottom whereby a down draft through said fuel combustion chamber is created, and means for controlling the admission of air at the top of said fuel combustion chamber.

2. A boiler furnace and feed water heater for steam boilers having a water chamber and heat areas, embodying therein a furnace, a water drum within said furnace below said boiler, a plurality of water tubes or legs the opposite ends of which open directly into the water space within said boiler, and into said water drum respectively, whereby a fuel combustion chamber is formed between the boiler and said legs, and the side wall of said furnace, and a gas and air combustion chamber in communication with said fuel combustion chamber intermediate said water tubes or legs and the water areas of the boiler is formed between said water tubes or legs, the boiler and said water drum, a fuel hopper surmounting and discharging into said fuel combustion chamber, said furnace being closed at the bottom whereby a down draft through said fuel combustion chamber is created, means for controlling the admission of air at the top of said fuel combustion chamber, and a jet nozzle having a discharge within said gas and air combustion chamber whereby the effective suction operative to induce the down draft to said combustion chamber may be increased.

3. A boiler furnace and feed water heater for steam boilers having a water chamber and heat areas, embodying therein a furnace, a fire grate adjacent the bottom of said furnace forming an ash pit therebelow, a water drum within said furnace below said boiler, and in close juxtaposition to said fire grate whereby fuel is excluded from beneath said drum, a plurality of water tubes or legs the opposite ends of which open directly into the water space within said boiler and into said water drum respectively, whereby a fuel combustion chamber is formed between the boiler and said legs and the side wall of said furnace and a gas and air combustion chamber in communication with said fuel combustion chamber intermediate said water tubes or legs and the water areas of the boiler is formed between said water tubes or legs, the boiler and said water drum, a fuel hopper surmounting and discharging into said fuel combustion chamber, said furnace being closed at the bottom whereby a down draft through said fuel combustion chamber is created, and means for controlling the admission of air at the top of said fuel combustion chamber.

4. A boiler furnace and feed water heater for steam boilers having a water chamber and heat areas, embodying therein a furnace, a fire grate adjacent the bottom of said furnace forming an ash pit therebelow, a water drum within said furnace below said boiler and in close juxtaposition to said fire grate whereby fuel is excluded from beneath said drum, a plurality of water tubes or legs the opposite ends of which open directly into the water space within said boiler, and into said water drum, respectively, whereby a fuel combustion chamber is formed between the boiler and said legs, and the side wall of said furnace, and a gas and air combustion chamber in communication with said fuel combustion chamber intermediate said water tubes or legs and the water areas of the boiler is formed between said water tubes or legs, the boiler and said water drum, a fuel hopper surmounting and discharging into said fuel combustion chamber, said furnace being closed at the bottom whereby a down draft through said fuel combustion chamber is created, means for controlling the admission of air at the top of said fuel combustion chamber, and a jet nozzle having a discharge within said gas and air combustion chamber whereby the effective suction operative to induce the down draft to said combustion chamber may be increased.

5. A boiler furnace and feed water heater for steam boilers having a water chamber and heat areas, embodying therein a furnace, a water drum within said furnace below said boiler, a plurality of water tubes or legs the opposite ends of which open directly into the water space within said boiler, and into said water drum, respectively, said water tubes or legs projecting downwardly and away from the side wall of said furnace whereby a fuel combustion chamber of gradually increased capacity toward the bottom thereof is formed between the boiler and said legs, and the side wall of said furnace, and a gas and air combustion chamber of gradually increased capacity toward the top thereof in communication with said fuel combustion chamber intermediate said water tubes or legs and the water areas of the boiler is formed between said water tubes or legs, the boiler and said water drum, a fuel hopper surmounting and discharging into said fuel combustion chamber, said furnace being closed at the bottom whereby a down draft through said fuel combustion chamber is created, means for controlling the admission of air at the top of said fuel combustion chamber.

6. A boiler furnace and feed water heater for steam boilers having a water chamber and heat areas, embodying therein a furnace, a water drum within said furnace below said boiler, a plurality of water tubes or legs the opposite ends of which open directly into the water space within said boiler, and into said water drum, respectively, said water tubes or legs projecting downwardly and away from the side wall of said furnace whereby a fuel combustion chamber of gradually increased capacity toward the bottom thereof is formed between the boiler and said legs, and the side wall of said furnace, and a gas and air combustion chamber of gradually increased capacity toward the top thereof in communication with said fuel combustion chamber intermediate said water tubes or legs and the water areas of the boiler is formed between said water tubes or legs, the boiler and said water drum, a fuel hopper surmounting and discharging into said fuel combustion chamber, said furnace being closed at the bottom whereby a down draft through said fuel combustion chamber is created, means for controlling the admission of air at the top of said fuel combustion chamber, and a jet nozzle having a discharge within said gas and air combustion chamber whereby the effective suction operative to induce the down draft to said combustion chamber may be increased.

7. A boiler furnace and feed water heater for steam boilers having a water chamber and heat areas, embodying therein a furnace, a fire grate adjacent the bottom of said furnace forming an ash pit therebelow, a water drum within said furnace below said boiler and in close juxtaposition to said fire grate whereby fuel is excluded from beneath said drum, a plurality of water tubes or legs the opposite ends of which open directly into the water space within said boiler, and into said water drum respectively, said water tubes or legs projecting downwardly and away from the side wall of said furnace whereby a fuel combustion chamber of gradually increased capacity toward the bottom thereof is formed between the boiler and said legs, and the side wall of said furnace, and a gas and air combustion chamber of gradually increased capacity toward the top thereof in communication with said fuel combustion chamber intermediate said water tubes or legs and the water areas of the boiler is formed between said water tubes or legs, the boiler and said water drum, a fuel hopper surmounting and discharging into said fuel combustion chamber, said furnace being closed at the bottom whereby a down draft through said fuel combustion chamber is created, and means for controlling the admission of air at the top of said fuel combustion chamber.

8. A boiler furnace and feed water heater for steam boilers having a water chamber and heat areas, embodying therein a furnace, a fire grate adjacent the bottom of said furnace forming an ash pit therebelow, a water drum within said furnace below said boiler and in close juxtaposition to said fire grate whereby fuel is excluded from beneath said drum, a plurality of water tubes or legs the opposite ends of which open directly into the water space within said boiler, and into said water drum respectively, said water tubes or legs projecting downwardly and away from the side wall of said furnace whereby a fuel combustion chamber of gradually increased capacity toward the bottom thereof is formed between the boiler and said legs, and the side wall of said furnace, and a gas and air combustion chamber of gradually increased capacity toward the top thereof in communication with said fuel combustion chamber intermediate said water tubes or legs and the water areas of the boiler is formed between said water tubes or legs, the boiler and said water drum, a fuel hopper surmounting and discharging into said fuel combustion chamber, said furnace being closed at the bottom whereby a down draft through said fuel combustion chamber is created, means for controlling the admission of air at the top of said fuel combustion chamber and a jet nozzle having a discharge within said gas and air combustion chamber whereby the effective suction operative to induce the down draft to said combustion chamber may be increased.

9. A boiler furnace and feed water heater for steam boilers having a water chamber and heat areas, embodying therein a furnace, a water drum within said furnace below said boiler, a plurality of water tubes or legs, the opposite ends of which open directly into the water space within said boiler, and into said water drum, respectively whereby a fuel combustion chamber is formed between the boiler and said legs, and the side wall of said furnace, and a gas and air combustion chamber in communication with said fuel combustion chamber intermediate said water tubes or legs and the water areas of the boiler is formed between said water tubes or legs, the boiler and said water drum, a water jacket for said furnace about said fuel combustion chamber, connections between said water jacket and said boiler, a fuel hopper surmounting and discharging into said fuel combustion chamber, said furnace being closed at the bottom whereby a down draft through said fuel combustion chamber is created, and means for controlling the admission of air at the top of said fuel combustion chamber.

10. A boiler furnace and feed water heater for steam boilers having a water chamber and heat areas, embodying therein a furnace, a water drum within said furnace below said boiler, a plurality of water tubes or legs, the opposite ends of which open directly into the water space within said boiler, and into said water drum, respectively whereby a fuel combustion chamber is formed between the boiler and said legs, and the side wall of said furnace, and a gas and air combustion chamber in communication with said fuel combustion chamber intermediate said water tubes or legs and the water areas of the boiler is formed between said water tubes or legs, the boiler and said water drum a fuel hopper surmounting and discharging into said fuel combustion chamber, said furnace being closed at the bottom whereby a down draft through said fuel combustion chamber is created, said combustion chamber being constricted adjacent the discharge of said hopper whereby the extension of the fire into said hopper is prevented and means for controlling the admission of air at the top of said fuel combustion chamber.

11. A boiler furnace and feed water heater for steam boilers having a water chamber and heat areas, embodying therein a furnace, a water drum within said furnace below said boiler, a plurality of water tubes or legs, the opposite ends of which open directly into the water space within said boiler, and into said water drum, respectively whereby a fuel combustion chamber is formed between the boiler and said legs, and the side wall of said furnace, and a gas and air combustion chamber in communication with said fuel combustion chamber intermediate said water tubes or legs and the water areas of the boiler is formed between said water tubes or legs, the boiler and said water drum, a fuel hopper surmounting and discharging into said fuel combustion chamber, said furnace being closed at the bottom whereby a down draft through said fuel combustion chamber is created and a plurality of independently operative means for controlling the admission of air at the top of said fuel combustion chamber whereby the heat temperature areas within said furnace may be increased or diminished.

12. A boiler furnace and feed water heater for steam boilers having a water chamber and heat areas, embodying therein a furnace, a water drum within said furnace below said boiler, a plurality of water tubes or legs, the opposite ends of which open directly into the water space within said boiler, and into said water drum, respectively whereby a fuel combustion chamber is formed between the boiler and said legs, and the side wall of said furnace, and a gas and air combustion chamber in communication with said fuel combustion chamber intermediate said water tubes or legs and the water areas of the boiler formed between said water tubes or legs, the boiler and said water drum, a fuel hopper surmounting and discharging into said fuel combustion chamber, said furnace being closed at the bottom whereby a down draft through said fuel combustion chamber is created, said combustion chamber being constricted adjacent the discharge of said hopper whereby the extension of the fire into said hopper is prevented and a plurality of independently operative means for controlling the admission of air at the top of said fuel combustion chamber whereby the heat temperature areas within said furnace may be increased or diminshed.

13. A boiler furnace and feed water heater for steam boilers having a water chamber and heat areas, embodying therein a furnace, a water drum within said furnace below said boiler, a plurality of water tubes or legs the opposite ends of which open directly into the water space within said boiler, and into said water drum respectively, said water tubes or legs projecting downwardly and away from the side wall of said furnace whereby a fuel combustion chamber of gradually increased capacity toward the bottom thereof is formed between the boiler and said legs, and the side wall of said furnace, and a gas and air combustion chamber of gradually increased capacity toward the top thereof in communication with said fuel combustion chamber intermediate said water tubes or legs and the water areas of the boiler is formed between said water tubes or legs, the boiler and said water drum, a fuel hopper surmounting and discharging into said fuel combustion chamber, said furnace being closed at the bottom whereby a down draft through said fuel combustion chamber is created, said combustion chamber being constricted adjacent the discharge of said hopper whereby the extension of the fire into said hopper is prevented and means for controlling the admission of air at the top of said fuel combustion chamber.

14. A boiler furnace and feed water heater for steam boilers having a water chamber and heat areas, embodying therein a furnace, a fire grate adjacent the bottom of said furnace forming an ash pit therebelow, a water drum within said furnace below said boiler and in close juxtaposition to said fire grate whereby fuel is excluded from beneath said drum, a plurality of water tubes or legs the opposite ends of which open directly into the water space within said boiler, and into said water drum respectively, said water tubes or legs projecting downwardly and away from the side wall of said furnace whereby a fuel combustion chamber of gradually increased capacity toward the bottom thereof is formed between the boiler and said legs, and the side wall of said furnace, and a gas and air combustion chamber of gradually increased capacity toward the top thereof in communication with said fuel combustion chamber intermediate said water tubes or legs and the water areas of the boiler is formed between said water tubes or legs, the boiler and said water drum, a fuel hopper surmounting and discharging into said fuel combustion chamber, said furnace being closed at the bottom whereby a down draft through said fuel combustion chamber is created, said combustion chamber being constructed adjacent the discharge of said hopper whereby the extension of the fire into said hopper is prevented and means for controlling the admission of air at the top of said fuel combustion chamber.

15. A boiler furnace and feed water heater for steam boilers having a water chamber and heat areas, embodying therein a furnace, a fire grate adjacent the bottom of said furnace forming an ash pit therebelow, a water drum within said furnace below said boiler and in close juxtaposition to said fire grate whereby fuel is excluded from beneath said drum, a plurality of water tubes or legs the opposite ends of which open directly into the water space within said boiler, and into said water drum respectively, said water tubes or legs projecting downwardly and away from the side wall of said furnace whereby a fuel combustion chamber of gradually increased capacity toward the bottom thereof is formed between the boiler and said legs, and the side wall of said furnace, and a gas and air combustion chamber of gradually increased capacity toward the top thereof in communication with said fuel combustion chamber intermediate said water tubes or legs and the water areas of the boiler is formed between said water tubes or legs, the boiler and said water drum, a fuel hopper surmounting and discharging into said fuel combustion chamber, said furnace being closed at the bottom whereby a down draft through said fuel combustion chamber is created, said combustion chamber being constructed adjacent the discharge of said hopper whereby the extension of the fire into said hopper is prevented and a plurality of independently operative means for controlling the admission of air at the top of said fuel combustion chamber whereby the heat temperature areas within said furnace may be increased or diminished.

16. A boiler furnace and feed water heater for steam boilers having a water chamber and heat areas, embodying therein a furnace, a fire grate adjacent the bottom of said furnace forming an ash pit therebelow, a water drum within said furnace below said boiler and in close juxtaposition to said fire grate whereby fuel is excluded from beneath said drum, a plurality of water tubes or legs the opposite ends of which open directly into the water space within said boiler, and into said water drum respectively, said water tubes or legs projecting downwardly and away from the side wall of said furnace whereby a fuel combustion chamber of gradually increased capacity toward the bottom thereof is formed between the boiler and said legs, and the side wall of said furnace, and a gas and air combustion chamber of gradually increased capacity toward the top thereof in communication with said fuel combustion chamber intermediate said water tubes or legs and the water areas of the boiler formed between said water tubes or legs, the boiler and said water drum, a water jacket for said furnace about said fuel combustion chamber, connections between said water jacket and said boiler, a fuel hopper surmounting and discharging into said fuel combustion chamber, said furnace being closed at the bottom whereby a down draft through said fuel combustion chamber is created, said combustion chamber being constricted adjacent the discharge of said hopper whereby the extension of the fire into said hopper is prevented and a plurality of independently operative means for controlling the admission of air at the top of said fuel combustion chamber whereby the heat temperature areas within said furnace may be increased or diminished.

17. A boiler furnace and feed water heater for steam boilers having a water chamber and heat areas, embodying therein a furnace, a water drum within said furnace below said boiler, a plurality of water tubes or legs, the opposite ends of which open directly into the water space within said boiler, and into said water drum, respectively whereby a fuel combustion chamber is formed between the boiler and said legs, and the side wall of said furnace, and a gas and air combustion chamber in communication with said fuel combustion chamber intermediate said water tubes or legs and the water areas of the boiler is formed between said water tubes or legs, the boiler and said water drum, adjacent water tubes or legs being provided with divergent surfaces within the air and gas combustion chamber, a fuel hopper surmounting and discharging into said fuel combustion chamber, said furnace being closed at the bottom whereby a down draft through said fuel combustion chamber is created, and means for controlling the admission of air at the top of said fuel combustion chamber.

18. A boiler furnace and feed water heater for steam boilers having a water chamber and heat areas, embodying therein a furnace, a fire grate adjacent the bottom of said furnace forming an ash pit therebelow, a water drum within said furnace below said boiler and in close juxtaposition to said fire grate whereby fuel is excluded from beneath said drum, a plurality of water tubes or legs the opposite ends of which open directly into the water space within said boiler, and into said water drum respectively, said water tubes or legs projecting downwardly and away from the side wall of said furnace whereby a fuel combustion chamber of gradually increased capacity toward the bottom thereof is formed between the boiler and said legs, and the side wall of said furnace, and a gas and air combustion chamber of gradually increased capacity toward the top thereof in communication with said fuel combustion chamber intermediate said water tubes or legs and the water areas of the boiler is formed between said water tubes or legs, the boiler and said water drum, adjacent water tubes or legs being provided with divergently turned surfaces within the air and gas combustion chamber, a fuel hopper surmounting and discharging into said fuel combustion chamber, said furnace being closed at the bottom whereby a down draft through said fuel combustion chamber is created, and means for controlling the admission of air at the top of said fuel combustion chamber.

19. A boiler furnace and feed water heater for steam boilers having a water chamber and heat areas, embodying therein a furnace, a water drum within said furnace below said boiler, a plurality of water tubes or legs, the opposite ends of which open directly into the water space within said boiler, and into said water drum, respectively whereby a fuel combustion chamber is formed between the boiler and said legs, and the side wall of said furnace, and a gas and air combustion chamber in communication with said fuel combustion chamber intermediate said water tubes or legs and the water areas of the boiler is formed between said water tubes or legs, the boiler and said water drum, a fuel hopper surmounting and discharging into said fuel combustion chamber, said furnace being closed at the bottom whereby a down draft through said fuel combustion chamber is created and a plurality of movable closures for said hopper whereby air may be admitted to said fuel combustion chamber through the whole or different portions of said hopper.

20. A boiler furnace and feed water heater for steam boilers having a water chamber and heat areas, said boiler furnace and feed water heater comprising a fuel combustion chamber fed from the top having a grate and an ash pit, a water drum located within the fuel combustion chamber with the fuel therein in contact therewith, means for supplying water to the water drum, a set of piping mounted in said fuel combustion chamber with the fuel therein in contact with the exterior of said set of piping the pipes thereof connecting the water drum and the water chamber of the steam boiler for delivering the heated water directly thereto, said set of piping forming a chamber for air and gases within it, means for communication between said chamber for air and gases and the heat areas of the steam boiler whereby a suction draft is provided through the chamber for air and gases and a downward draft is provided through the fuel combustion chamber when the fuel combustion chamber is open at its top, said fuel combustion chamber comprising in cross-section the space between the interior of the sides of the boiler furnace and feed water heater and the exterior of said set of piping and the exterior of the sides of the water drum, and said ash-pit being air-tight; substantially as set forth.

21. A boiler furnace and feed water heater for steam boilers having a water chamber and heat areas, said boiler furnace and feed water heater comprising a fuel combustion chamber fed from the top having a grate and an ash-pit, a water drum located within the fuel combustion chamber with the fuel therein in contact therewith, means for supplying water to the water drum, a set of piping mounted in said fuel combustion chamber with the fuel therein in contact with the exterior of said set of piping the pipes thereof connecting the water drum and the water chamber of the steam boiler for delivering the heated water directly thereto, said set of piping forming a chamber for air and gases within it, means for communication between said chamber for air and gases and the heat areas of the steam boiler whereby a suction draft is provided through the chamber for air and gases and a downward draft is provided through the fuel combustion chamber when the fuel combustion chamber is open at its top said fuel combustion chamber being of form in cross-section and said set of piping arranged therein to provide downwardly increasing space for the disposition of fuel between the exterior of the set of piping and the interior of the sides of said chamber, and said ash-pit being air-tight; substantially as set forth.

22. A boiler furnace and feed water heater for steam boilers having a water chamber and heat areas, said boiler furnace and feed water heater comprising a fuel combustion chamber fed from the top having a grate and an ash-pit, a water drum located within the fuel combustion chamber longitudinally thereof with the fuel therein in contact therewith, means for supplying water to the water drum, a set of piping mounted in said fuel combustion chamber with the fuel therein in contact with the exterior of said set of piping and the pipes thereof directly connecting the water drum and the water chamber of the steam boiler, said set of piping forming a chamber for air and gases within it, means for communication between said chamber for air and gases and the heat areas of the steam boiler whereby a suction draft is provided through the chamber for air and gases and a downward draft is provided through the fuel combustion chamber when the fuel combustion chamber is open at its top, said fuel combustion chamber comprising a cross-section the space between the sides of the boiler furnace and feed water heater and the exterior of said set of piping and the exterior of the sides of the water drum, said grate being located on or above the plane of the bottom of the water drum and below the lower ends of said set of piping, and said ash-pit being air-tight; substantially as set forth.

23. A boiler furnace and feed water heater for steam boilers having a water chamber and heat areas, said boiler furnace and feed water heater comprising a fuel combustion chamber fed from the top having a grate and an ash-pit, a water drum located within the fuel combustion chamber longitudinally thereof with the fuel therein in contact therewith, means for supplying water to the water drum, a set of piping mounted in said fuel combustion chamber with the fuel therein in contact with the exterior of said set of piping and the pipes thereof directly connecting the water drum and the water chamber of the steam boiler, said set of piping forming a chamber for air and gases within it, means for communication between said chamber for air and gases and the heat areas of the steam boiler whereby a suction draft is provided through the chamber for air and gases and a downward draft is provided through the fuel combustion chamber when the fuel combustion chamber is open at its top, means for introducing external air or steam into said chamber for air and gases from the front toward the rear thereof to provide additional suction draft through said chamber, said fuel combustion chamber comprising in cross-section the space between the interior of the sides of the boiler furnace and the feed water heater and the exterior of said set of piping and the exterior of the sides of the water drum, said grate being located on or above the plane of the bottom of the water drum, and below the lower ends of said set of piping, and said ash-pit being air-tight; substantially as set forth.

24. A boiler furnace and feed water heater for steam boilers having a water chamber and heat areas, said boiler furnace and feed water heater comprising a fuel combustion chamber fed from the top having a grate and an ash-pit, a water drum located within the fuel combustion chamber longitudinally thereof with the fuel therein in contact therewith, means for supplying water to the water drum, a set of piping mounted in said fuel combustion chamber with the fuel therein in contact with the exterior of said set of piping and the pipes thereof directly connecting the water drum and the water chamber of the steam boiler, said set of piping forming a chamber for air and gases within it, means for communication between said chamber for air and gases and the heat areas of the steam boiler whereby a suction draft is provided through the chamber for air and gases and a downward draft is provided through the fuel combustion chamber when the fuel combustion chamber is open at its top, means for introducing external air or steam into said chamber for air and gases from the front toward the rear thereof to provide additional suction draft through said chamber and means for controlling the passage of said external air or steam through the same, said fuel combustion chamber comprising in cross-section the space between the interior of the sides of the boiler furnace and feed water heater and the exterior of said set of piping and the exterior of the sides of the water drum, said grate being located on or above the plane of the bottom of the water drum and below the lower ends of said set of piping, and said ash-pit being air-tight; substantially as set forth.

25. A boiler furnace and feed water heater for steam boilers having a water chamber and heat areas, said boiler furnace and feed water heater comprising a fuel combustion chamber fed from the top having a grate and an ash-pit, a water drum located within the fuel combustion chamber longitudinally thereof with the fuel therein in contact therewith, means for supplying water to the water drum, a set of piping mounted in said fuel combustion chamber with the fuel therein in contact with the exterior of said set of piping and the pipes thereof directly connecting the water drum and the water chamber of the steam boiler, said set of piping forming a chamber for air and gases within it, means for communication between said chamber for air and gases and the heat areas of the steam boiler whereby a suction draft is provided through the chamber for air and gases and a downward draft is provided through the fuel combustion chamber when the fuel combustion chamber is open at its top, doors in the front of the boiler furnace and feed water heater communicating with the chamber for air and gases having dampers, said fuel combustion chamber comprising in cross-section the space between the interior of the sides of the boiler furnace and feed water heater and the exterior of said set of piping and the exterior of the sides of the water drum, said grate being located on or above the plane of the water drum and below the lower ends of said set of piping, and said ash-pit being air-tight; substantially as set forth.

26. A boiler furnace and feed water heater for steam boilers having a water chamber and heat areas, embodying therein a furnace, a water drum within said furnace below said boiler, a plurality of water tubes or legs, the opposite ends of which open directly into the water space within said boiler, and into said water drum, respectively whereby a fuel combustion chamber is formed between the boiler and said legs, and the side wall of said furnace, and a gas and air combustion chamber in communication with said fuel combustion chamber intermediate said water tubes or legs and the water areas of the boiler is formed between said water tubes or legs, the boiler and said water drum, a fuel hopper surmounting and discharging into said fuel combustion chamber, said furnace being closed at the bottom whereby a down draft through said fuel combustion chamber is created, means for controlling the admission of air at the top of said fuel combustion chamber, said furnace having an opening therethrough communicating with said gas and air combustion chamber, and closure means therefor whereby air may be excluded from or admitted to said gas and air combustion chamber.

In witness whereof, I hereunto affix my signature in the presence of two subscribing witnesses, this 13th day of July, 1915.

JOHN RALPH SURRELL.

Witnesses:
E. E. MOLLER,
F. T. WENTWORTH.